United States Patent Office 3,705,146
Patented Dec. 5, 1972

3,705,146
FORMALDEHYDE ADDUCTS OF SACCHARIDES
Harry A. Smith, Midland, Mich., assignor to The Dow Chemical Company, Midland, Mich.
No Drawing. Filed Dec. 15, 1969, Ser. No. 885,323
Int. Cl. C07c *47/18*
U.S. Cl. 260—209 R       4 Claims

ABSTRACT OF THE DISCLOSURE

Formaldehyde adducts of aliphatic polyhydroxy alcohols having the general formula $$R[O(CH_2O)_xH]_y$$

wherein each $x$ is independently an integer such that the average $x$ is at least 3,
each $y$ is an integer not less than 3, and
R is the residue formed by the removal of the hydroxyl groups from an aliphatic polyhydroxy alcohol.

Such adducts may be used in place of conventional sources of formaldehyde to prepare or cure phenolic resins.

BACKGROUND OF THE INVENTION

Lauch and Quade in U.S. Pat. 1,055,405 (1913) as reported by Walker in Formaldehyde, Reinhold Publishing Co., 1964, at p. 271, describe the formation of solid compounds from formaldehyde and bioses such as maltose, sucrose, and lactose. According to their findings, colorless crystalline compounds containing 1, 2, 3 or 4 moles of available formaldehyde for each mole of biose may be obtained by dissolving the biose in a minimum amount of hot water, adding formaldehyde and then evaporating the solvent at 70° C. under reduced pressure. Quade in U.S. Pat. 1,062,501 (1913) and Rosenberg in German Pat. 189,036 (1907) teach the preparation of biose-formaldehyde compounds containing up to 5 units of combined formaldehyde per molecule of sugar. All of these compounds contained less than one mole of formaldehyde per hydroxyl.

SUMMARY OF THE INVENTION

According to the present invention, formaldehyde adducts of aliphatic polyhydroxy alcohols having the general formula $$R[O(CH_2O)_xH]_y$$

wherein each $x$ is independently an integer such that the average $x$ is at least 3,
each $y$ is an integer not less than 3, and
R is the residue formed by the removal of the hydroxyl groups from an aliphatic polyhydroxy alcohol have been discovered. Such formaldehyde adducts are prepared by reacting formaldehyde in solution with an aliphatic polyhydroxy alcohol under essentially neutral conditions and then drying the reaction product at or below about 50° C. The resulting formaldehyde adducts have a substantially higher concentration of formaldehyde than has been shown in the art. For example, sucrose has been reacted with formaldehyde under the conditions of the invention to add 37 formaldehyde units onto one molecule of sucrose.

The essential and novel feature of the present invention is the discovery, preparation and use of formaldehyde adducts containing a very high concentration of available formaldehyde. The dried compounds of the invention are usually solids having little or no offensive odor. When dissolved in water, the solid compounds readily release formaldehyde for any necessary application such as preparing or curing a phenolic resin. These formaldehyde donors may be prepared conveniently without the use of acid or base to unexpectedly increase the donor capability of the hydroxylated substrate.

In the preferred preparation of the formaldehyde adducts of the present invention, a neutral concentrated aqueous solution of formaldehyde is prepared, the hydroxylated compound is added to an excess of the aqueous formaldehyde solution and the mixture is allowed to react for a few hours at room temperature. The reaction mixture then is cooled to about the freezing point of water and the water is distilled from the product under vacuum. The product is separated as a solid or in some cases a semisolid and may be stored at room temperature over extended periods of time with little or no offensive formaldehyde odor or loss of formaldehyde content.

The novel compounds of the present invention are obtained as a result of removing the solvent from the reaction mixture of the polyol and formaldehyde at a temperature below 50° C. Such evaporation of the solvent may be conducted at any temperature below 50° C. which permits the removal of the solvent. Subatmospheric pressure is generally employed to facilitate the solvent removal. Such pressures are dependent upon the solvent used in the reaction and upon the temperature of the evaporation. Higher boiling solvents and lower temperatures require lower pressures to evaporate the solvent.

Although the temperature may be as high as 50° C., temperatures below about 25° C. are preferred, with temperatures of about −10° C. to about 10° C. being especially preferred. As increasingly higher temperatures are used in the evaporation, more decomposition is encountered resulting in the addition of fewer formaldehyde units onto each hydroxyl.

The selection of the aliphatic polyhydroxy alcohol is not critical. Essentially any alcohol which has three or more hydroxyl groups may suitably be used to prepare the formaldehyde adducts. Although the operability of the reaction of the invention does not depend upon the number of hydroxyl groups, a high number of hydroxyl groups in the molecule is preferred because of the substantial amount of formaldehyde that may be added to the molecule. Representative examples of compounds which are suitable for use in the present invention include polyhydroxyalkanes, monosaccharides, disaccharides, polysaccharides, cellulose and solvent-soluble cellulose derivatives. Compounds containing five hydroxyl groups or more are preferred with sucrose, polyvinyl alcohol and solvent-soluble cellulose derivatives being especially preferred.

The formaldehyde may be reacted with the aliphatic polyhydroxy alcohol in essentially any form although the reaction of neutral liquid formaldehyde solutions is preferred. Aqueous solutions are especially preferred although other solvents for the formaldehyde, such as ethers, may also be employed. Highly concentrated solutions are preferred, with aqueous solutions containing 30 to 55% by weight formaldehyde being of special interest.

The comparative amounts of formaldehyde and hydroxylated compound may vary widely. More than 3 moles of formaldehyde are reacted for each OH group in the molecule to produce a formaledhyde donor having at least three moles of available formaldehyde per mole of hydroxyl groups. Compounds of the invention that contain at least an average of 5 units of formaldehyde for each hydroxyl are preferred.

Excess formaldehyde is usually employed to assure that the desired number of formaldehyde units are added onto the hydroxyls of the polyol. For example, when 10 units of formaldehyde are to be added per hydroxyl, 15 moles of formaldehyde may be conveniently added to the reaction per hydroxyl.

The reaction conditions during the reaction of the formaldehyde with the polyol in solution may vary widely. Usually, the reaction is conducted under ambient conditions for a time sufficient to allow the formaldehyde to add to the hydroxyls. This reaction before solvent removal, for example, may be conducted at temperatures of about 0° to about 100° C. for about 1 to about 48 hours.

Thus, by the process of the present invention, formaldehyde adducts of polyols containing large amounts of available formaldehyde are prepared by reacting a polyhydroxylated aliphatic alcohol with formaldehyde in a neutral solution and then removing the solvent at or below about 50° C. These adducts may then be employed to prepare or cure phenolic resins.

SPECIFIC EMBODIMENTS

Example 1

To a solution of 9.07 grams of hydroxyethyl cellulose having a hydroxyethyl molar substitution of 2.5 per repeating unit sold under the trade name Natrosol 250 G, and 200 ml. of water, 34.3 grams of a 43.87% aqueous formaldehyde solution were added. The mixture was stirred for 90 minutes and then freeze-dried under vacuum at a temperature of about 0 to −5° C. A white solid was obtained weighing 17.1 grams. Sodium sulfite analysis of the solid indicated that 54% of the compound by weight was formaledhyde. The $CH_2O/OH$ ratio was 3.6/1. The dried product had no offensive odor.

Example 2

In the same manner as described in Example 1, 99 grams of sucrose was reacted with 984.75 grams of 43.87% aqueous formaldehyde. The reaction mixture was stirred for 2 hours and freeze-dried at a temperature of about 0 to −5° C. to give a white paste containing 52% formaldehyde and 33% water by weight. The $CH_2O/OH$ ratio was 4.6/1 in the 640 grams of product. The paste had no offensive odor.

Example 3

In the same manner as described by the examples above, 88 grams of polyvinyl alcohol and 820.61 grams of 43.87% aqueous formaldehyde were reacted with stirring for a period of 2 hours. The product, a white solid weighing 474 grams, contained 60% formaldhyde and 16% water by weight. The $CH_2O/OH$ ratio was 5/1. The final product had no offensive odor.

Example 4

In the same manner as described by the examples above, 8.1 grams of cellulose, which had been digested with 200 grams of concentrated HCl for 24 hours and then neutralized with NaOH, and 183.4 grams of 43.8% aqueous formaldehyde were reacted with stirring for one hour and then freeze-dried. The product, a white solid weighing 268 grams, contained 25.2% formaldehyde, 28% water, 3% cellulose derivative and 45.8% NaCl. The $CH_2O/OH$ ratio was 15/1. The final product had no offensive odor.

Example 5

In the same manner as described in Example 1, 9.2 grams of glycerine was reacted with 240.3 grams of 37% aqueous formaldehyde at room temperature. The reaction mixture was freeze-dried under vacuum at about 0 to 5° C. The product obtained was a white paste weighing 89 grams. Analysis of the product indicated that by weight 74% was formaldehyde, 10.3% was glycerine and the remainder was water. The $CH_2O/OH$ ratio was 7.3/1.

Example 6

A phenolic resin was made using the sucrose adduct of formaldehyde prepared in Example 2 as the formaldehyde donor. The resin was prepared by reacting 146.1 grams of 90.8% phenol in water, 172.54 grams of water, 36.35 grams of 49.86% caustic and 144.4 grams of the sucrose-formaldehyde paste prepared in Example 2. The mixture formed was cooked for 4¾ hours at 80° to 85° C. resulting in a resole resin having a Gardner viscosity of Z.

Example 7

In the same manner as Example 6, a phenolic resin was prepared by reacting 310.3 grams of 90.8% phenol in water, 342.8 grams of water, 76.7 grams of 50.19% caustic, and 270.0 grams of the polyvinyl alcohol formaldehyde compound prepared in Example 3. The mixture formed was cooked for 2⅙ hours at 80° to 85° C. resulting in a resole resin having a Gardner viscosity of $Z_1Z_1Z_2$.

Example 8

In the same manner as Example 6, a phenolic resin was prepared by reacting 108.6 grams of 90.8% phenol in water, 26.9 grams of 50.19% caustic, and 225.0 grams of the cellulose-formaldehyde adduct prepared in Example 4. The mixture formed was cooked 1¾ hours at 80° to 85° C. resulting in a resole resin having a Gardner viscosity of $Z_1$.

Example 9

The resoles of Examples 6–8 were used to bond two surfaces and gave peel strengths comparable to or superior to a resin made in the manner of Examples 6–8 but using aqueous formaldehyde in place of the compounds of this invention.

Example 10

Novolac resins prepared by reacting formaldehyde with phenol in the presence of a catalyst were cured using the formaldehyde adducts of sugar (sugar-$CH_2O$) and polyvinyl alcohol (PVOH-$CH_2O$) prepared in Examples 2 and 3 respectively. The adducts of the invention are compared to the known curing agent hexamethylenetetramine (hexa). The results of this comparison and the preparation of the uncured phenol-formaldehyde resin are shown in Table I. In each test enough of the formaldehyde adduct was employed to yield 1.38 grams of $CH_2O$, and 1.07 grams of hexamethylenetetramine was added per 10 grams of resin.

TABLE I.—USE OF $CH_2O$ DONORS TO CURE NOVOLACS

| Test | Original resin | | Cured properties | |
|---|---|---|---|---|
| | F/P [1] Catalyst | Curing agent | Hardness | Color |
| 1 | 0.77 $Ca(C_2H_3O_2)_2$ | Sugar-$CH_2O$ | Hard, tough | Yellow. |
| 2 | 0.77 $Ca(C_2H_3O_2)_2$ | PVOH-$CH_2O$ | do | Do. |
| 3 | 0.77 $Ca(C_2H_3O_2)_2$ | Hexa | Hard-brittle | Brown. |
| 4 | 0.75 $H_2SO_4$ | PVOH-$CH_2O$ | Hard-tough | White. |
| 5 | 0.75 $H_2SO_4$ | Hexa | Hard-brittle | Brown. |

[1] Formaldehyde/phenol mole ratio.

In the same manner as described in the examples above, other polyhydroxy alcohols such as hexanetriol, maltose, glucose, other sugars, starch and other derivatives of cellulose may be reacted with exces aqueous formaldehyde and the resulting mixture may be evaporated under vacuum at or below 50° C. to obtain formaldehyde adducts containing a high amount of available formaldehyde.

Also, in the same maner, formaldehyde may be added to the solution with the hydroxylated compound as a gas or a solution of formaldehyde in another solvent such as diethyl ether or dioxane.

I claim:
1. A formaldehyde adduct having the formula

$$R[O(CH_2O)_xH]_y$$

wherein
each $x$ is independently an integer such that the average $x$ is at least 3,
each $y$ is an integer not less than 3, and
R is the residue formed by the removal of the hydroxyl groups from a monosaccharide or disaccharide.

2. The adduct of claim 1 wherein R is the residue of sucrose.

3. The adduct of claim 1 wherein R is the residue of maltose.

4. The adduct of claim 1 wherein R is the residue of glucose.

References Cited
UNITED STATES PATENTS

| | | | |
|---|---|---|---|
| 1,062,501 | 5/1913 | Quade et al. | 260—209 R |
| 1,974,064 | 9/1934 | Ford et al. | 260—209 R |
| 3,202,620 | 8/1965 | Merten et al. | 260—209 R |
| 3,355,447 | 11/1967 | O'Connell et al. | 260—209 R |

LEWIS GOTTS, Primary Examiner

J. R. BROWN, Assistant Examiner

U.S. Cl. X.R.

260—47 R, 55, 57 R, 58, 59, 91.3 PV, 212, 606